United States Patent
Duggan et al.

(10) Patent No.: US 9,443,363 B2
(45) Date of Patent: Sep. 13, 2016

(54) REAL-TIME LOCATION DETECTION USING EXCLUSION ZONES

(71) Applicant: Consortium P, Inc., Rochester, NH (US)

(72) Inventors: Robert J. Duggan, Strafford, NH (US); Dragan Vidacic, Exeter, NH (US); Keith A. Nevish, Barrington, NH (US)

(73) Assignee: Consortium P, Inc., Rochester, NH (US)

( * ) Notice: Subject to any disclaimer, the term of this patent is extended or adjusted under 35 U.S.C. 154(b) by 64 days.

(21) Appl. No.: 14/636,372

(22) Filed: Mar. 3, 2015

(65) Prior Publication Data

US 2015/0248797 A1 Sep. 3, 2015

Related U.S. Application Data

(60) Provisional application No. 61/946,979, filed on Mar. 3, 2014.

(51) Int. Cl.
| | |
|---|---|
| *G08B 5/22* | (2006.01) |
| *G08B 21/00* | (2006.01) |
| *G08B 1/08* | (2006.01) |
| *G08B 1/00* | (2006.01) |
| *G08G 1/123* | (2006.01) |
| *G09B 29/10* | (2006.01) |

(Continued)

(52) U.S. Cl.
CPC ............ *G07C 9/00111* (2013.01); *G06K 7/00* (2013.01)

(58) Field of Classification Search
CPC ... G01S 5/0252; G01S 5/0294; G06Q 10/00; G06Q 10/06; G06Q 50/22; H04W 64/00; G06K 7/10009; G06K 17/0022; G06K 19/0717; G06K 19/0723; G06K 2007/10504; G06K 2017/0045; G06K 7/10079; G06K 7/10326; G06K 7/10366
See application file for complete search history.

(56) References Cited

U.S. PATENT DOCUMENTS

| | | |
|---|---|---|
| 6,674,368 B2 | 1/2004 | Hawkins et al. |
| 7,719,430 B2 | 5/2010 | Lee |

(Continued)

OTHER PUBLICATIONS

RadarFind, RadarFind Introduces Sentry AV for RTLS Alarm, On-Line Article, Jan. 19, 2010, TeleTracking Technologies, Pittsburgh, PA. http://www.teletracking.com.

(Continued)

*Primary Examiner* — Steven Lim
*Assistant Examiner* — Muhammad Adnan
(74) *Attorney, Agent, or Firm* — Maine Cernota & Rardin

(57) ABSTRACT

A system and method for real-time location detection consists of a scalable real time location system (RTLS). It provides revised real time object location determinations. It includes a tag within a location environment, a processor to calculate a location of the tag, and at least one exclusion zone in the environment. Processing includes an original location determination of the tag and a revised location determination of the tag. The revised location determination is calculated by applying attributes of at least one exclusion zone to the original location determination of the tag. Some exclusion zones are defined by no-fly exclusion zones. The revised location determination improves the operation of the RTLS by correcting for impossible and improbable original location determinations. For embodiments, system deployment consists of three phases: collection of training and testing data, network training and testing, and network adaptive maintenance.

16 Claims, 16 Drawing Sheets

(51) Int. Cl.
*H04Q 5/22* (2006.01)
*G05B 11/01* (2006.01)
*G08C 19/12* (2006.01)
*G07C 9/00* (2006.01)
*G06K 7/00* (2006.01)

(56) References Cited

U.S. PATENT DOCUMENTS

| | | | |
|---|---|---|---|
| 7,864,047 B2 | 1/2011 | Aninye et al. | |
| 9,013,282 B2* | 4/2015 | Li | G01S 13/878 340/12.51 |
| 9,182,480 B2* | 11/2015 | Larson | G01S 13/751 |
| 9,224,096 B2* | 12/2015 | Oppenheimer | G06F 21/50 |
| 9,298,958 B1* | 3/2016 | Amir | G06K 7/10009 |
| 2005/0010663 A1 | 1/2005 | Tatman et al. | |
| 2005/0040968 A1* | 2/2005 | Damarla | H04W 64/00 340/5.53 |
| 2008/0012767 A1 | 1/2008 | Caliri et al. | |
| 2009/0315767 A1 | 12/2009 | Scalisi et al. | |
| 2010/0141432 A1* | 6/2010 | Sugla | G06Q 10/00 340/539.13 |
| 2010/0252627 A1 | 10/2010 | Perkins et al. | |
| 2011/0043358 A1 | 2/2011 | Duggan et al. | |
| 2011/0205077 A1 | 8/2011 | Cavallaro et al. | |
| 2011/0276338 A1* | 11/2011 | Warner | G06Q 50/22 705/2 |

OTHER PUBLICATIONS

PCT International Search Report dated May 29, 2015 of International Application No. PCT/US2015/018422 international filing date Mar. 3, 2015.

PCT Written Opinion of the ISA dated May 29, 2015 of International Application No. PCT/US2015/018422 international filing date Mar. 3, 2015.

* cited by examiner

PORTION OF A SIMPLIFIED RTLS-CONFIGURED BUILDING ENVIRONMENT

AN EXAMPLE OF EXCLUSION ZONES BINARY IMAGE WITH BLACK COLOR DENOTING IMPOSSIBLE (EXCLUDED) ZONES AND WHITE COLOR DENOTING ALLOWED LOCATIONS

SIMPLIFIED EXCLUSION ZONE ENVIRONMENT

FIG. 3 SECTION AA EXCLUSION ZONE REPRESENTATION

OVERALL OPERATION FLOWCHART

EXCLUSION ZONE GRADIENT DESCENT 'ENERGY' PLOT

EXCLUSION ZONE NEURAL NET TRAINING

NEURAL NET IMPLEMENTATION APPROACH

AN EXAMPLE OF EXCLUSION ZONES BINARY IMAGE WITH BLACK COLOR DENOTING EXCLUDED ZONES AND WHITE COLOR DENOTING ALLOWED LOCATIONS

BLURRED MAP GENERATION FLOWCHART

BLURRED EXCLUSION ZONE GENERATION FLOWCHART

SELECTION & CREATION OF EXCLUSION ZONE (TOP) A
FILLING WITH COLOR/INTENSITY GRADIENT BOTTOM B

CREATION OF "SMOOTH" EXCLUSION ZONE

NO-FLY EXCLUSION ZONE REVISED LOCATION & SIMPLIFIED VIRTUAL PATH

NO-FLY EXCLUSION ZONE VIRTUAL PATH REPLACEMENT FOR "AS THE CROW FLIES" MEASUREMENTS

NO-FLY EXCLUSION ZONE FLOWCHART

REAL-TIME LOCATION DETECTION USING EXCLUSION ZONES

RELATED APPLICATIONS

This application claims the benefit of U.S. Provisional Application No. 61/946,979, filed Mar. 3, 2014.

FIELD OF THE INVENTION

The invention relates to real-time wireless object location tracking and, more particularly, to a system and method for object location detection employing exclusion zones, where determining the location of a tracked object is improved by calculating defined zones in which the object is unlikely to or cannot exist. Original location determinations are revised to present a revised location based on exclusion zone calculations.

BACKGROUND OF THE INVENTION

Real Time Location Systems (RTLSs) track objects, typically by associated tags. For individuals, a badge is used for tracking in environments such as health-care facilities, warehouses, and other areas where location is important. Personnel badges and asset tags may include Radio Frequency Identification (RFID) (passive or active), and communicate with fixed or hand-held readers.

While known tags and communication standards may hold the potential for full-scale deployment (tracking many objects in real-time), in reality, they fall short. Accuracy is impaired by the tracking environment and time delays from processing bottlenecks when realistic quantities of objects are tracked. This leads to stale, inaccurate, object location indications and even loss of tracking. Solutions are needed to support the detection performance needs of actual applications.

Although not related to detection performance, some tracking applications refer to "exclusion zones". For example, warning systems alert authorities when individuals approach or enter forbidden areas. A particular definition is: " . . . an exclusion zone (i.e. a geographic area that the remote tag 104 is prohibited from entering) . . . " (U.S. Pat. No. 6,674,368). Some examples of "exclusion zones" refer strictly to a circular geographic area of a given radius, as for tracking movements of criminals on parole (U.S. Pat. Nos. 7,864,047, 8,169,316). RadarFind®'s Sentry AV sounds an alarm when a tag approaches a laundry room or exit to avoid loss of the tag. ("RadarFind Introduces Sentry AV for RTLS Alarm", January, 2010). RadarFind® is a registered trademark of the RadarFind Corporation of Delaware.

Other applications describe "exclusion zone compliance circuits" that disable communications of Global Navigation Satellite System (GNSS) devices when they are in geographic areas such as nations prohibiting such devices (U.S. Pat. No. 8,054,181).

In a sports application, helmet-mounted infrared LEDs are tracked. Here, exclusion zones are areas of false data as would be caused by infrared (IR) interference from a light source that might be confused with the helmet-mounted infrared LEDs. Since the XYZ locations of these sources are known, data at these coordinates is not considered and ignored (U.S. 2011/0205077).

Finally, animal "exclusion zones" refers to areas around which they are prohibited. These are virtual pens to keep livestock away (U.S. Pat. No. 7,719,430).

What is needed is a system and method for improved real-time object location determination that improves detection performance and scales with the requirements of the application.

SUMMARY OF THE INVENTION

Embodiments provide a real time location system (RTLS) for revised real time location determination of at least one object comprising a location environment; at least one tag located within the location environment; a processor to calculate a location of the at least one tag located within the location environment; at least one exclusion zone in the location environment; an original location determination of the tag in the location environment; a revised location determination of the tag in the location environment, the revised location determination calculated by the processor by applying attributes of the at least one exclusion zone to the original location determination of the at least one tag if it is determined that the original location determination is cospatial with the at least one exclusion zone, and the revised location determination modifying operation of the RTLS by modifying original location determinations. For another embodiment, the revised location determination comprises calculation by a neural network by applying attributes of the at least one exclusion zone to the original location determination of the at least one tag. For some embodiments, the calculation by the neural network comprises setup and training of the neural network. For another embodiment, the training comprises blurring of the at least one exclusion zone. For continuing embodiments, the blurring comprises Gaussian distribution. For other embodiments, the revised location determination comprises gradient descent. In another embodiment, the training comprises diverted output. With another embodiment, the at least one exclusion zone comprises locations in which it would be improbable for tags to be found. In other embodiments, the at least one exclusion zone comprises locations in which it would be impossible for tags to be found. For embodiments, the original location determination comprises noise. For some embodiments, the original location determination comprises at least one missed reading of signals from the at least one tag. For another embodiment, the revised real time location determination comprises an input map of the location environment. For further embodiments, the revised real time location determination comprises receiving wireless RF transmissions from the at least one tag at at least one transceiver.

Other embodiments provide a method for revised real time location determination of at least one object by a real time location system (RTLS) comprising the steps of designating a location environment; obtaining a map of the location environment; defining at least one exclusion zone in the location environment; providing at least one tag located within the location environment; obtaining an original location determination; producing a revised location determination of the tag in the location environment, the revised location determination calculated by applying attributes of the at least one exclusion zone to the original location determination of the at least one tag, and the revised location determination modifying operation of the RTLS by correcting for impossible and improbable original location determinations. For another embodiment, the step of producing a revised location comprises training a neural network; and the revised location determination is calculated by the neural network. In other embodiments, the step of training comprises measured data from the at least one tag. For some embodiments, the measured data comprises at least one physically measurable property associated with a position in three-dimensional space. For another embodiment, the step of training comprises modeled data. For further embodiments, the method further comprises mathematically defining a no-fly exclusion zone polyhedron; inputting a location estimate; comparing the location estimate with a four dimensional space-time region of the no-fly exclusion zone polyhedron; determining if the location estimate is within the no fly exclusion zone polyhedron region; locating a boundary of the no-fly exclusion zone polyhedron closest to the location estimate; defining allowed locations in the closest boundary; revising the estimated location to the defined allowed locations; and creating a revised virtual path from the estimated location to the revised location.

Further embodiments provide a neural network real time location system (RTLS) for revised real time location determination of at least one object comprising a map representing a location environment; at least one tag located within the location environment; a neural network to process a location of the at least one tag located within the location environment, the neural network trained with wireless RF data from the at least one tag and corresponding locations of the at least one tag; at least one exclusion zone in the location environment, the map processed by Gaussian blurring of the at least one exclusion zone; an original location determination of the tag in the location environment; a revised location determination of the tag in the location environment, the revised location determination calculated by the neural network by applying attributes of the at least one exclusion zone to the original location determination of the at least one tag including gradient descent algorithms, and the revised location determination modifying operation of the RTLS by correcting for impossible and improbable original location determinations.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Exclusion Zone Operation Methods

Implementation of exclusion zone calculations improves real-time object location determination so that performance scales with the requirements of the application. Exclusion zone calculations overcome determinations for locations that are improbable or impossible. When a tag's original location is determined to be associated with an exclusion zone, the location is revised based on exclusion zone calculations. As used here, exclusion zones are defined by physical locations, regular or irregular, and/or logical boundaries. Exclusion zones can be related to attributes of the objects associated with tags. For example, exclusion zones can be associated with people generally, or specific individuals wearing tags.

Figure 1:
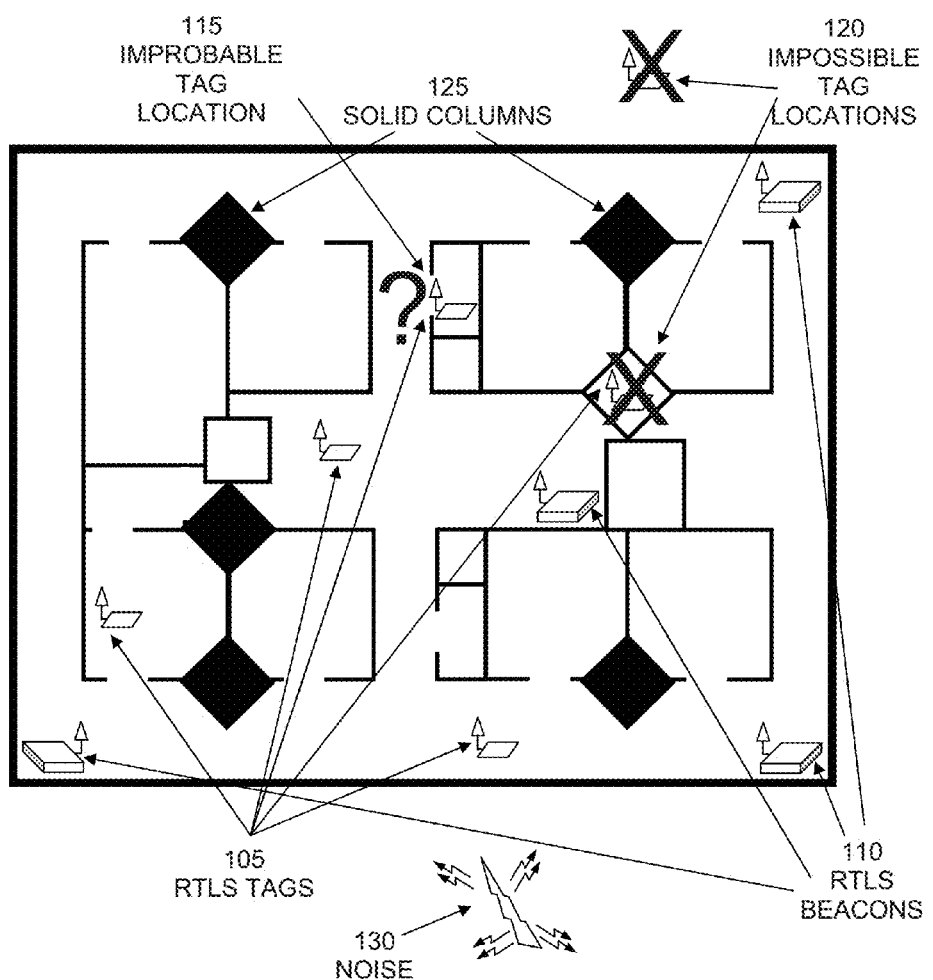
FIG. 1 is a simplified depiction of a portion of an RTLS-configured building environment in accordance with an embodiment of the invention.

FIG. 1 presents a simplified example of a portion of a Real Time Locating System (RTLS)—configured building environment 100. RTLS tags 105 are associated with objects/individuals and exist at locations within the environment. RTLS Beacons/Routers 110 are located within the environment to receive transmissions from RTLS tags 105. While locations for tags 105 are typically as expected, at times their determined locations can appear to be spurious, or in error. A tag location could be improbable 115, such as a location not normal for the tag or the object with which it is associated. Or, a tag location could be impossible 120, such as a location within solid columns 125 in which a tag could not exist. For example, an improbable tag location 115 can be from location data from a wrist band tag assigned to a patient that ended up in an equipment closet or clean core—improbable locations. As explanation, operating rooms are grouped around a clean core. The clean core is used for sterile supply storage and is the cleanest area of the operating suite. Only authorized staff allowed in the clean core. Impossible location examples include inside a structural column or a wall, or three feet outside a sixth floor window. Interference or noise 130 can cause such spurious determined locations.

Figure 2:
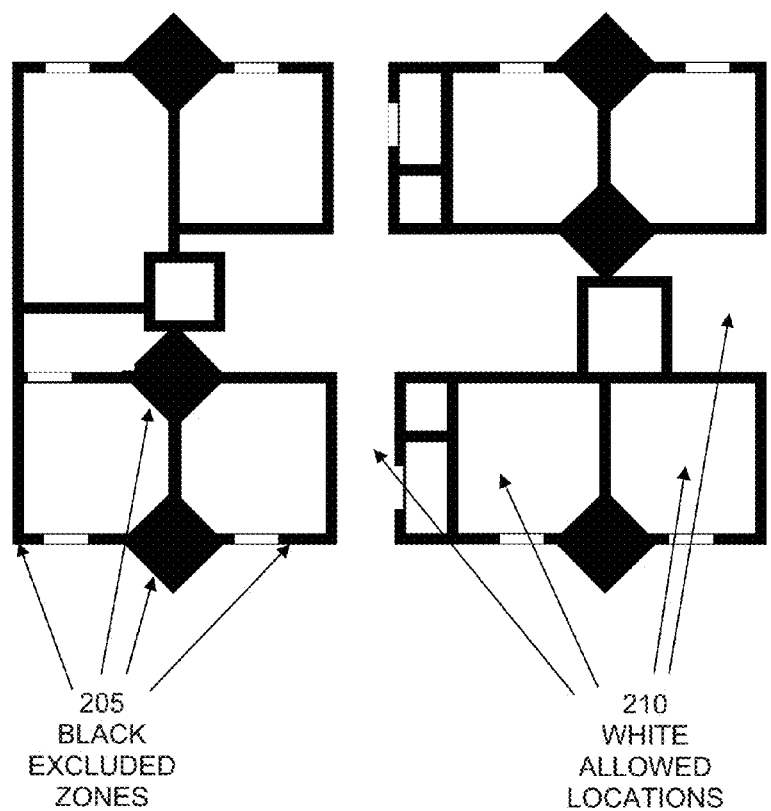
FIG. 2 depicts normal (allowed) and impossible (excluded) zones for an exclusion zone map configured in accordance with an embodiment of the invention.

FIG. 2 depicts normal (allowed) and impossible (excluded) zones for an exclusion zone map 200 as employed by embodiments. As referenced, tags cannot appear in some areas of the environment in which the system is operating. These locations are referred to as (impossible) exclusion zones 205 depicted as black. This is in contrast to expected (allowed) locations 210 depicted as white. This is an example of an exclusion zones binary image with black color denoting impossible (excluded) zones and white color denoting allowed locations.

Exclusion zone operation embodiments define areas/volumes that correspond to spurious tag location readings or undesirable tag location translational movements (where tags should not normally appear such as cutting a corner). Contributors to spurious location determination include noise in the RF system, missed readings by a Beacon/Router, and interpolated positions between Beacons as can be seen during direction changes. Such factors can cause calculation errors in determining the location, and actually determine a tag to be in the wrong place (inside a wall, for instance). Exclusion zone calculation embodiments define excluded areas against which the system checks after an initial location is calculated. In embodiments, if it is determined that the calculated location is violating an exclusion zone, the system runs another algorithm to start the process of changing/revising the calculated location. Exclusion zones can comprise logical as well as physical definitions and boundaries.

For embodiments, the exclusion zone is blurred, portrayed as a transition from black to white. In embodiments using a Gaussian blur, this transition is Gaussian.

Figure 3:
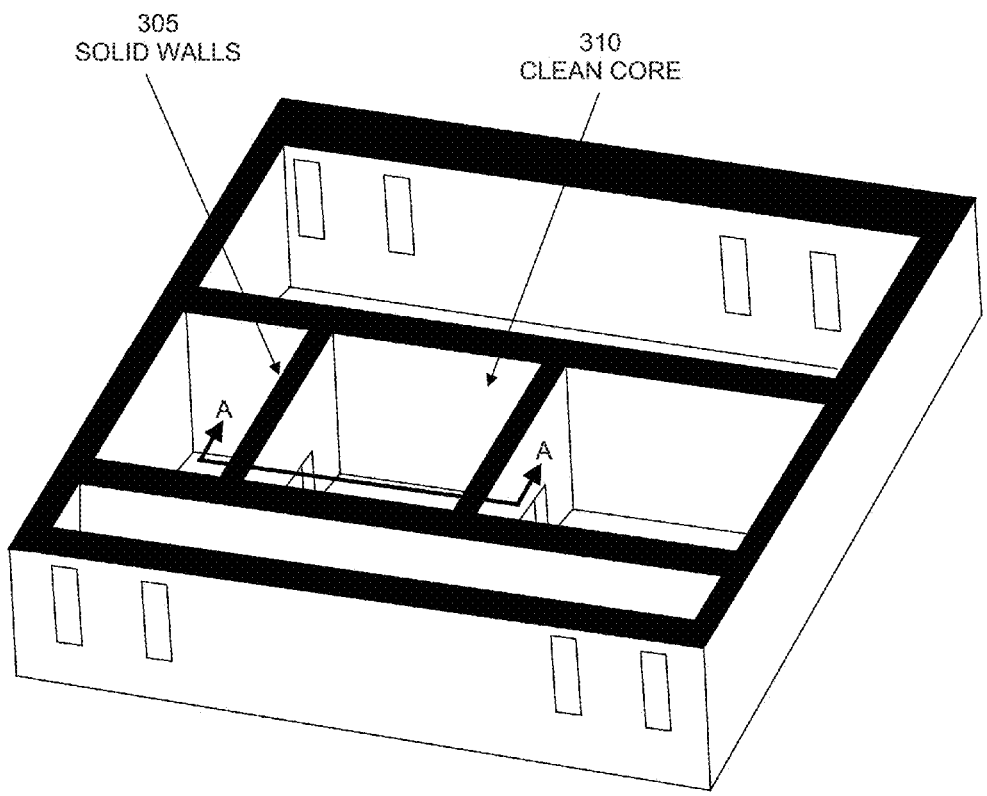
FIG. 3 is a depiction of a simplified exclusion zone environment configured in accordance with an embodiment of the invention.

FIG. 3 depicts a simplified exclusion zone environment 300 with solid walls 305, identifying Section AA through walls of a clean core 310. This horizontal section from the top-down view identifies typical room areas bounded by solid walls. It would be normal for tags to have locations in the room areas, but not within the walls.

Figure 4:
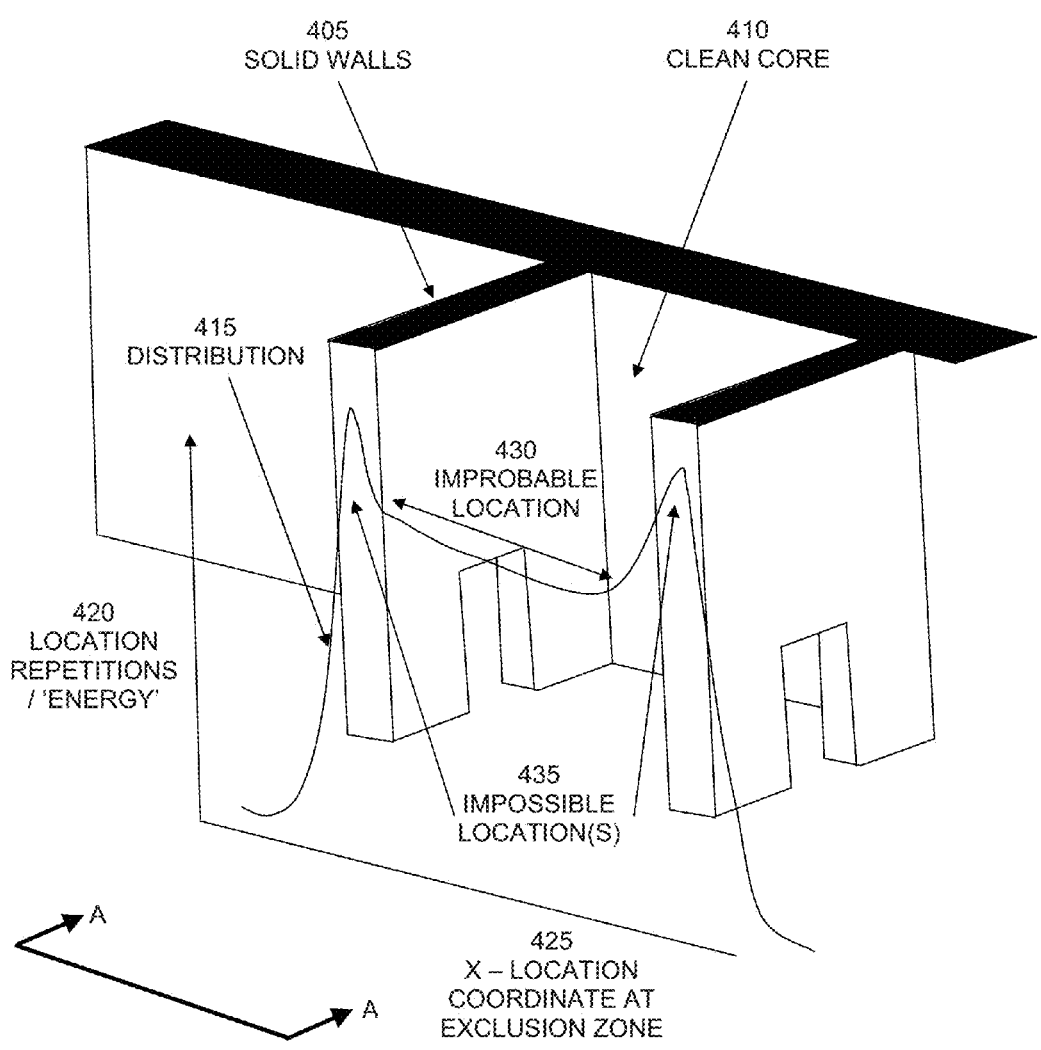
FIG. 4 is a depiction of FIG. 2 Section AA exclusion zone representation configured in accordance with an embodiment of the invention.

FIG. 4 depicts a section 400 of a clean core 410 between walls 405 from FIG. 3, Section AA exclusion zone representation, with a simplified Gaussian curve distribution superimposed on it 415. This simplified depiction illustrates an aspect of the operation of exclusion zones. In embodiments, a count is kept of the number of times a tag is determined to have the same location (repetition). The combination of tag location repetition and proximity to the smoothed boundary of an exclusion zone are used to determine a "revised" location. Vertical axis 420 depicts the number of repetitions ("energy") required for a tag's revised location to fall within an exclusion zone x (plane) location coordinate 425. Outside exclusion zones, the correction is not applied, and a few or even one/no repetition(s) will result in the revised location calculation being equal to the initial location. For improbable exclusion zone locations 430, the number of repetitions would be an intermediate count; for 'impossible' exclusion zone locations 435, no number of repetitions may be enough to produce a revised location in the 'impossible' exclusion zone.

Figure 5:
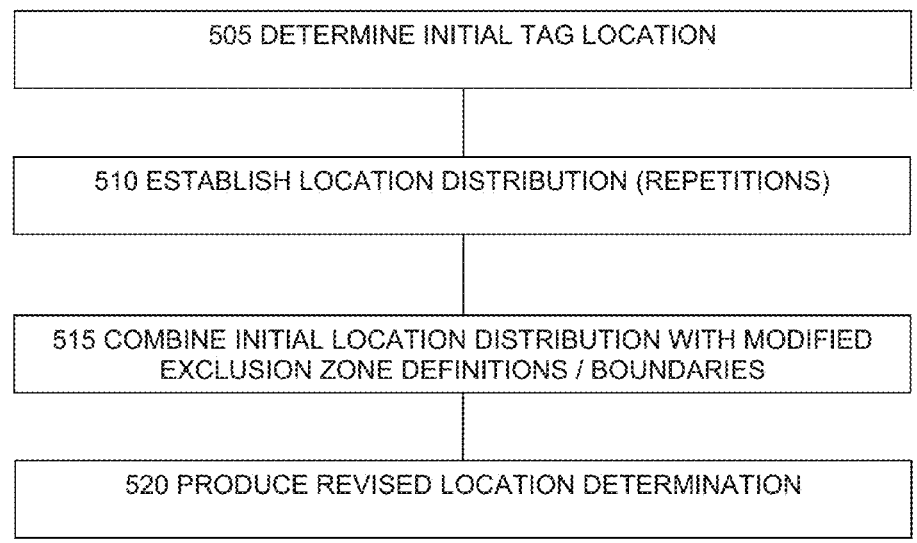
FIG. 5 is a flowchart of overall operation to produce revised location determinations based on exclusion zones configured in accordance with an embodiment of the invention.

FIG. 5 is a high level flow chart 500 of overall operation to produce revised location determinations based on exclusion zones. Initial tag location is determined 505. Detected location distribution (repetitions) is established 510. The initial location distribution is combined with modified exclusion zone definitions and or boundaries 515. Location determinations are revised based on the effects of the exclusion zones 520.

Figure 6:
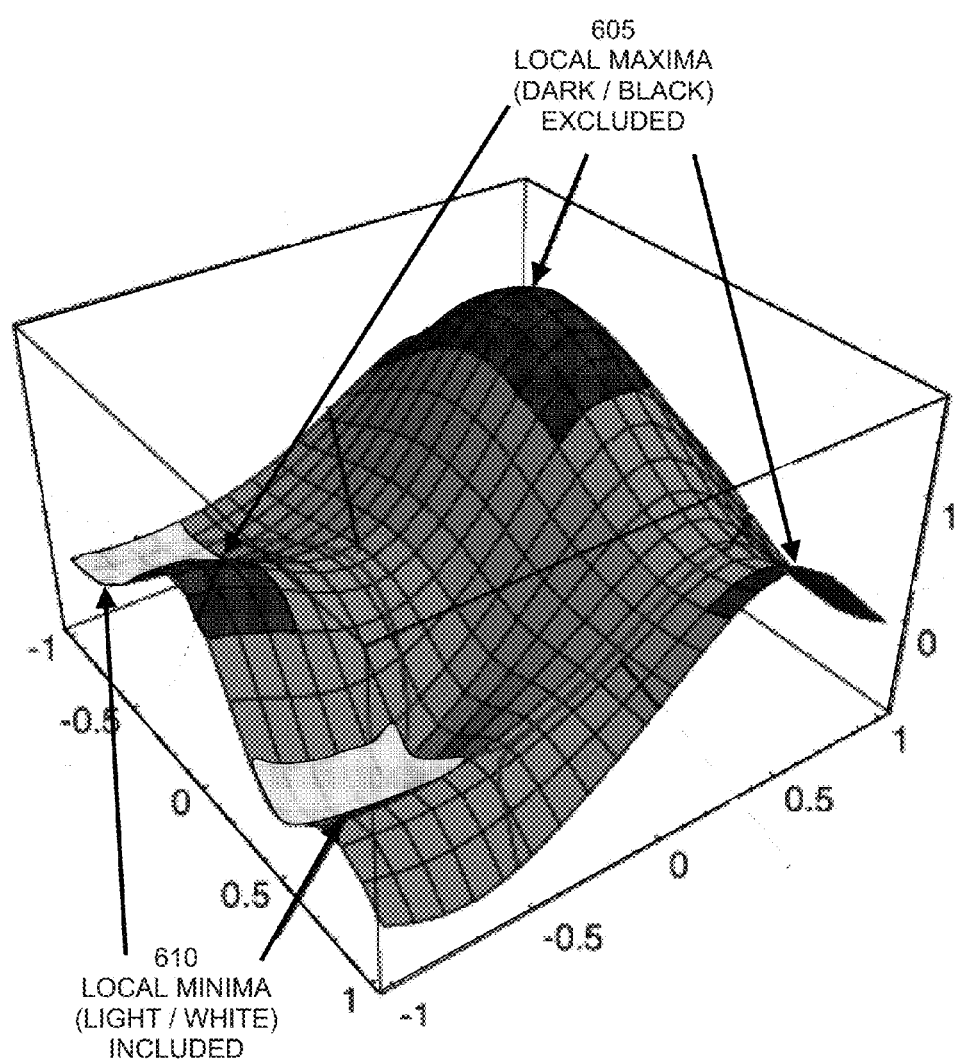
FIG. 6 is a depiction of an exclusion zone 'energy' plot configured in accordance with an embodiment of the invention.

FIG. 6 presents aspects of exclusion zone gradient descent operation envisioned as a three dimensional "energy" plot surface 600, where the high points (local maxima) are in dark/black 605 and the low points (local minima) are light/white 610. Shades of gray correspond to elevations between the highest (black) and the lowest (white) values. As mentioned, as location determinations are being made for a tag/object, the number of times an object is determined to be at the same location (repetition) is tracked. The repetition count for a tag's calculated location can be considered to correspond to a probability or 'energy' associated with that location determination. As an analogy, envision a ball placed on the exclusion zone defined surface. A ball placed on this surface will tend to roll down the surface to the lowest energy state or lowest elevation. The ball can be prevented from 'rolling' down the gradient (Gaussian shaped in this example) if it has enough energy. This 'energy' comes from the repeated location calculations (repetitions) previously mentioned. Therefore, only a few, spurious, miscalculations will result in the ball 'rolling' to the lowest (more probable, or included, location) level for the revised location. However, repeated/constant readings in an improbable excluded area will maintain the tag location in the excluded area even though it is very unlikely to be there. The previous example for this was of a patient wrist band tag with an initial location determination in an equipment clean core. Although an improbable location, if for some reason the tag had been improperly removed from a patient and placed in a nurse's pocket, and then entered the equipment clean core, the location could be correct. In embodiments, many surfaces are created with multiple various transition geometries to actually force the 'ball' to go to the desired (revised) location. For embodiments, the typical objective is to make the 'ball' go to the nearest 'approved' location. For other embodiments, other locations will be the preferred revised location.

Exclusion Zone Neural Network Implementation Method Embodiments

For embodiments, exclusion zone implementation includes neural networks. Generally, the network is trained regarding exclusion zones such that it never makes a calculation (revised location determination) that locates an object inside an excluded area. Neural network location determination is made by inputting data from transmitting tags into the neural network, which produces an output of the location for each detected tag. Initial setup involves neural net training.

Figure 7:
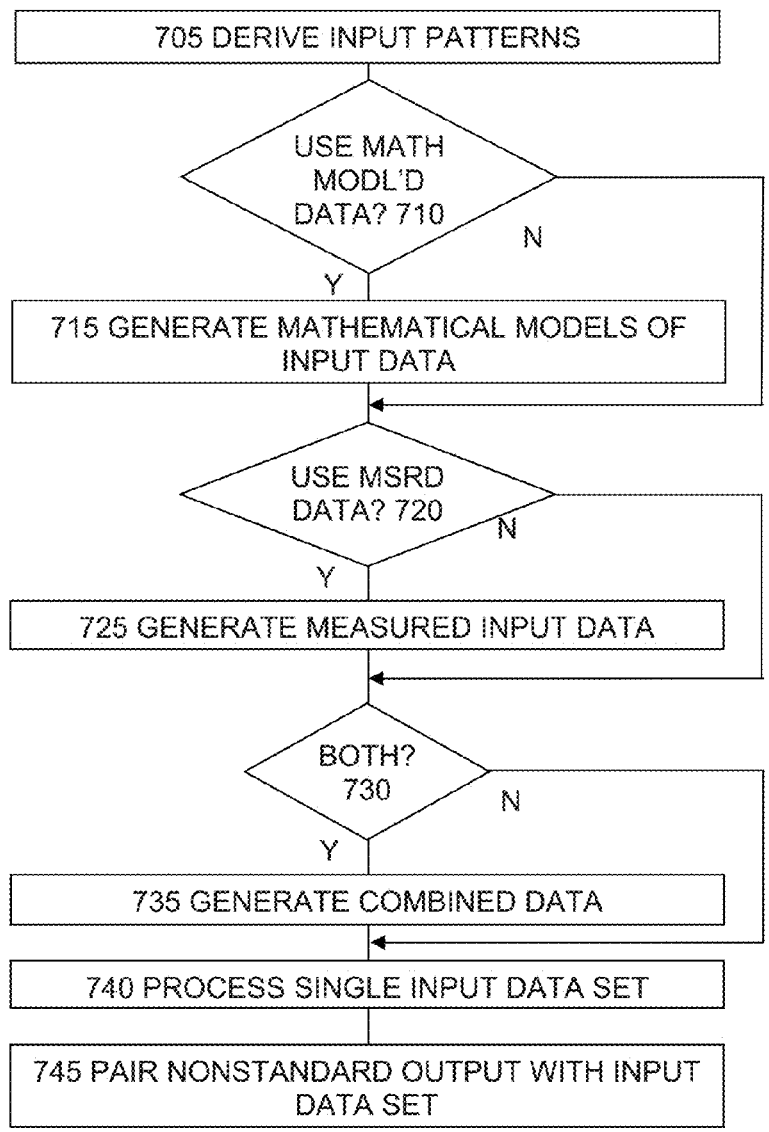
FIG. 7 is a flowchart of neural network training steps configured in accordance with an embodiment of the invention.

FIG. 7 depicts steps 700 involved in an embodiment of neural network training for exclusion zones. Training is accomplished by presenting a plurality of varied input patterns to the neural net, and designating the desired result (location). After training, the network's pattern recognition abilities enable mapping real-time input patterns to appropriate output location determinations. Patterns for input are derived 705. For embodiments, two types of training data are used. One type is generated data from mathematical models of, for example, indoor electromagnetic field propagation, and the other type is from actual sampled data inside the facility. Embodiments use either one type or the other type of data, or both types merged and used simultaneously for training. A decision is made whether to include mathematical modeled input data 710. If included, mathematical modeled input data is generated 715. A decision is made whether to include measured input data 720. If included, measured input data is generated 725. If both types were generated 730, they are combined into one data set 735. A single set of training input data is presented to the neural network 740. This training is essentially presenting the neural network with a multitude of different patterns for it to remember. In embodiments, each pattern associates some physically measureable property with a position in three dimensional space. Nonlimiting examples include signal strength, time of arrival, and time of flight of the RF signal. Other nonlimiting examples include infrared and vibration detection of the tag. Once trained, the network is then prepared to process various patterns and output where it thinks the tag is located, based on everything it has been taught. For embodiments, during training, nonstandard outputs are paired with training inputs 745. Standard pairing would involve providing an output representing the input. As an analogous example, a standard facial recognition training example would present the network with a collection of faces and the associated names. Just one picture of a person is not presented, but many pictures are shown, some with glasses, some with hats, from the side, from below, from above. As many different views are provided as possible, so that the network can pick the correct name output, even if it is presented with a view never presented in training. In the nonstandard approach of this invention, training pairings are made with outputs not representing the actual initial location. The objective is not to know the name associated with the face, or in this case, the initial determined location coordinates of the tag at position x, y, z. Rather, the objective is to have the network present what it thinks the (revised) x, y, z location is based on ALL of the patterns presented in training. This requires the network to make an interpretation, and then interpolate/extrapolate a solution based on its previous training. In other words, the nonstandard training 'distorts' the initial location determination to output a revised location. This revised location incorporates ALL input, including 'diverted' location determinations used during training.

Figure 8:
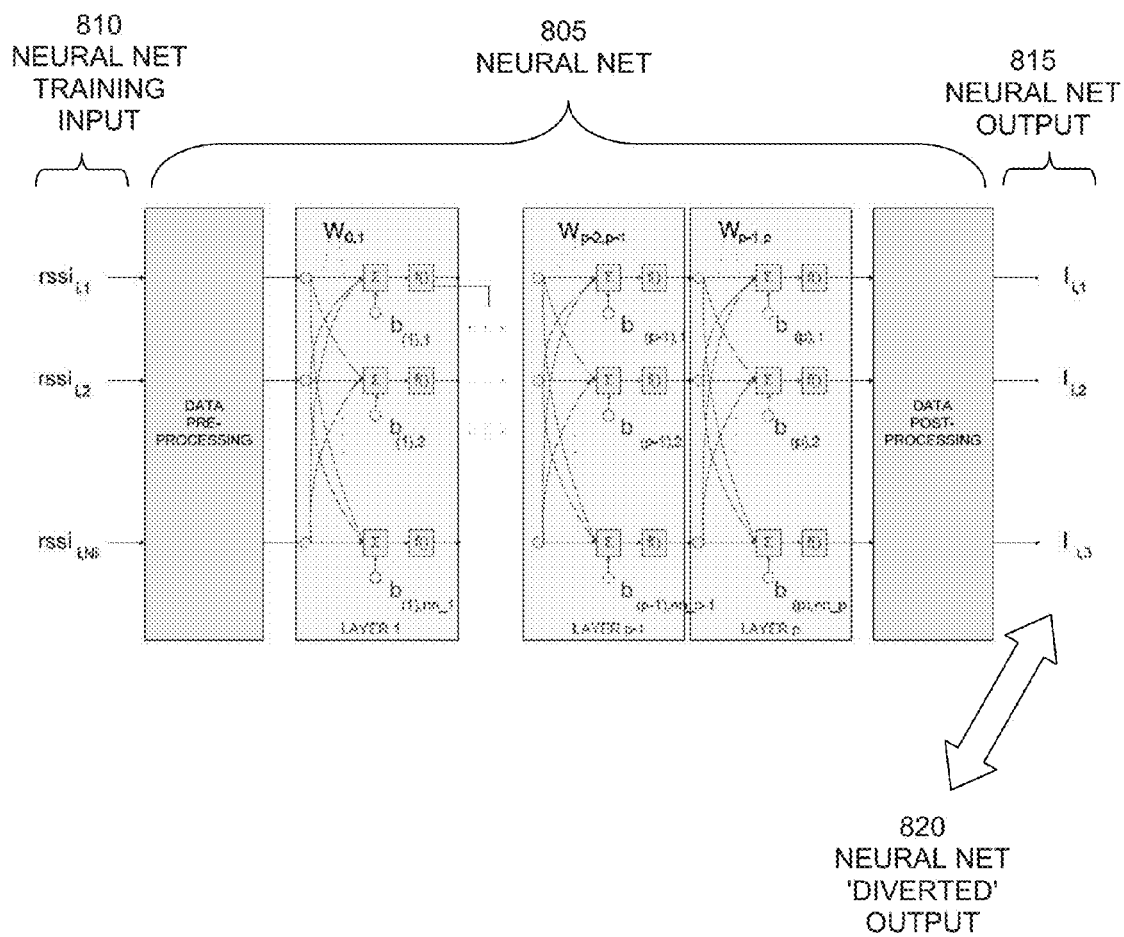
FIG. 8 is a depiction of a neural network exclusion zone implementation configured in accordance with an embodiment of the invention.

FIG. 8 illustrates a neural net implementation approach process 800 for exclusion zone training in which the neural network 805 is given input patterns for training 810, and has neural net output 815 which can comprise being provided with a neural net 'diverted' output 820. In effect, telling it that the answer is something different from the initial determined location. Therefore, to exclude an area, the neural network is given the physical measurements (signal strength, for example) but 'told' (training output) that those measurements were taken someplace other than where they actually were taken. In this way, for embodiments, the network never comes up with a (revised) location answer for an excluded region. It outputs locations in the areas corresponding to the trained output locations. Essentially, the network's decision making has been 'pre-biased' and corrections after-the-fact do not have to be made.

Each of the after-the-fact blurring (described next) and pre-biased neural network methods of calculating exclusion zones has its own applications. The first method, calculating a revised location after the fact with blurring, works for situations in which it is possible to be in a particular location, even if not probable. The second, pre-biased neural network method, works well for situations in which it is not possible for a tag to be in a particular location, such as three feet outside a window, on the sixth floor, hovering in space.

Exclusion Zone Blurring Method Embodiments

Figure 9:
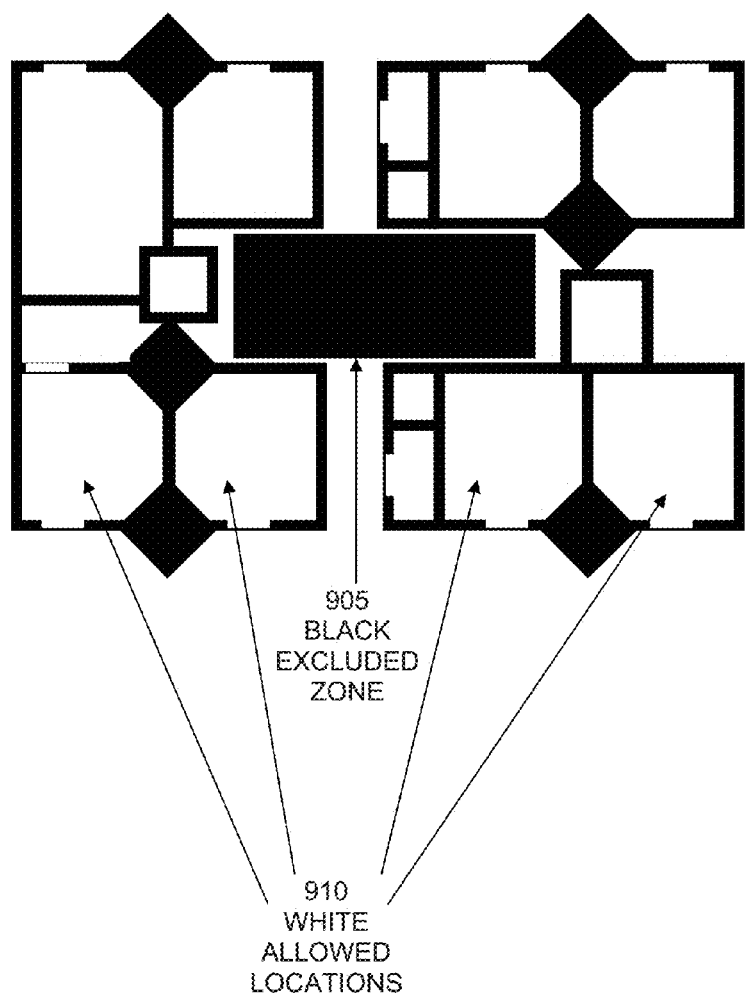
FIG. 9 is a depiction of an example of exclusion zones' binary image with black color denoting (improbable/impossible) excluded zones and white color denoting allowed locations configured in accordance with an embodiment of the invention.

FIG. 9 depicts an example of an exclusion zones binary image with black color denoting excluded zones and white color denoting normal (allowed) locations for an exclusion zone map 900 as employed by embodiments. Certain types of RF tags are not expected to appear in specific areas where the system is operating (improbable locations such as a clean core). In embodiments, those locations are referred to as (improbable) exclusion zones 905. This is in contrast to expected (allowed) locations 910. During the neural network training process of the RTLS, if an exclusion zone is present (i.e. if a parameter exclusion map name in a main configuration file is different from 'none'), waypoints taken inside those (improbable) zones are extracted from the collected waypoint data, and the neural network is trained only with the allowed set of points. For embodiments, the map determining the exclusion zones is a binary portable network graphics (png) format image with black color (grayscale level 0) marking the exclusion zones and white color (grayscale level 255) marking the allowed zones. PNG is a bitmapped image format that employs lossless data compression. PNG supports palette-based images (with palettes of 24-bit RGB or 32-bit RGBA colors), grayscale images (with or without alpha channel), and full-color non-palette-based RGB(A) images (with or without alpha channel). The png format attributes especially support exclusion zone processing. An example of an exclusion zone setup method follows.

In embodiments, scripts perform the data exclusion. For example, scripts for training overlap and test overlap call another function/script to exclude data points that actually performs the data exclusion. Embodiments execute scripts in MATLAB®. MATLAB® is a registered trademark of MathWorks, Inc., Corporation in Natick, Mass.

Figure 10:
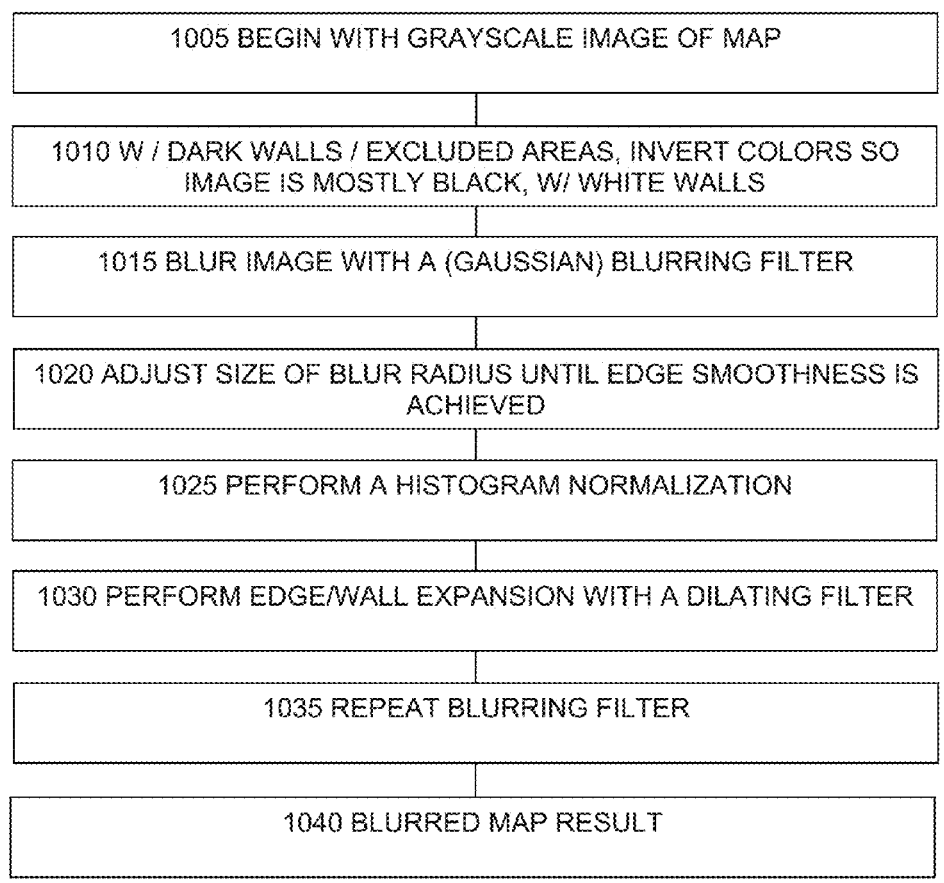
FIG. 10 is a flowchart of blurred map generation configured in accordance with an embodiment of the invention.

When creating an exclusion zone map as explained in FIGS. 9 & 10, an approach is to use image processing software. A nonlimiting example is the GNU Image Manipulation Program (GIMP).

FIG. 10 presents embodiment steps 1000 for the creation of a blurred map of the facility for exclusion zones. Embodiments begin with a grayscale image of the map of the area for RTLS 1005. For images with dark walls/excluded areas, invert the colors so that the image is mostly black, with walls being white 1010. Blur the image with a blurring filter 1015. Embodiments use a Gaussian Blur for fastest and most desired location results. Adjust the size of the blur radius until edge smoothness is achieved 1020. This stage produces smooth wall edges. Perform a histogram normalization 1025. Perform edge/wall expansion with a dilating filter 1030. Repeat blurring filter 1035 as previously in step 1015. The resulting map 1040 has smooth wall edges and can be used as the basis for combination with larger exclusion zones. In embodiments, all exclusion zones are part of a new layer in the overall image.

Figure 11:
FIG. 11 is a flowchart of blurred exclusion zone generation steps configured in accordance with an embodiment of the invention.

FIG. 11 is a flow chart that depicts steps 1100 defining generation of the blurred exclusion zone within the previously blurred map. It begins 1105 with the blurred map result 1040 from the steps of FIG. 10. Embodiments next create a particular exclusion zone consisting of two layers by adding a new layer 1110. Define a layer such as 'exclusion zone binary' with an attribute of transparency 1115. In this layer, the exclusion zone is formed by selecting the (rectangular or other) area in the image that will be the area for the exclusion zone 1120 (see FIG. 12A). The zone is filled with foreground color (black) 1125. The result of this operation is shown in FIG. 12B. Next, define a second exclusion zone area layer such as 'exclusion zone smooth' 1130. Repeat the exclusion zone selection 1135, also as shown in FIG. 12A. In this zone layer, apply a blend with a bi-linear shape setting and a color gradient as the filling pattern 1140, as shown in FIG. 13. The result is that one layer in the image contains black areas of the binary exclusion layer. This is used in embodiments in, for example, MATLAB® software, for data exclusion. The second layer contains smooth exclusion zones again used by, for example, MATLAB® scripts to generate data to run a gradient descent model by system software (the tracking layer service in embodiments). In embodiments, these results are then saved as an exclusion zone smooth binary eXperimental Computing Facility (xcf) file 1145. XCF is the native image format of the GIMP image-editing program. It saves all program data handled related to the image, including each layer, the current selection, channels, transparency, paths and guides. Next, unlock all layers except Exclusion zone binary layer 1150. This can be done (for example), with the Layers tool. Next, flatten the image 1155. The resulting image is a black and white binary exclusion zone image to be saved 1160 as a PNG file and processed (as exclusion data) by, for example, MATLAB® train Overlap or test Overlap scripts. Next, the flattened image file (such as Exclusion_zone_smooth_binary.xcf) is opened, and the Exclusion zone_binary layer is unlocked (all other layers locked), the Exclusion zone_binary layer image is selected and flattened 1165. Save resulting image as, for example, Exclusion_Zone_smooth.xcf file 1170. Apply one Gaussian blur (as in step 1015) 1175 and save image in PNG format 1180. This image is ready to be processed by, for example, a MATLAB® generateDerivative.m script.

Figure 12:
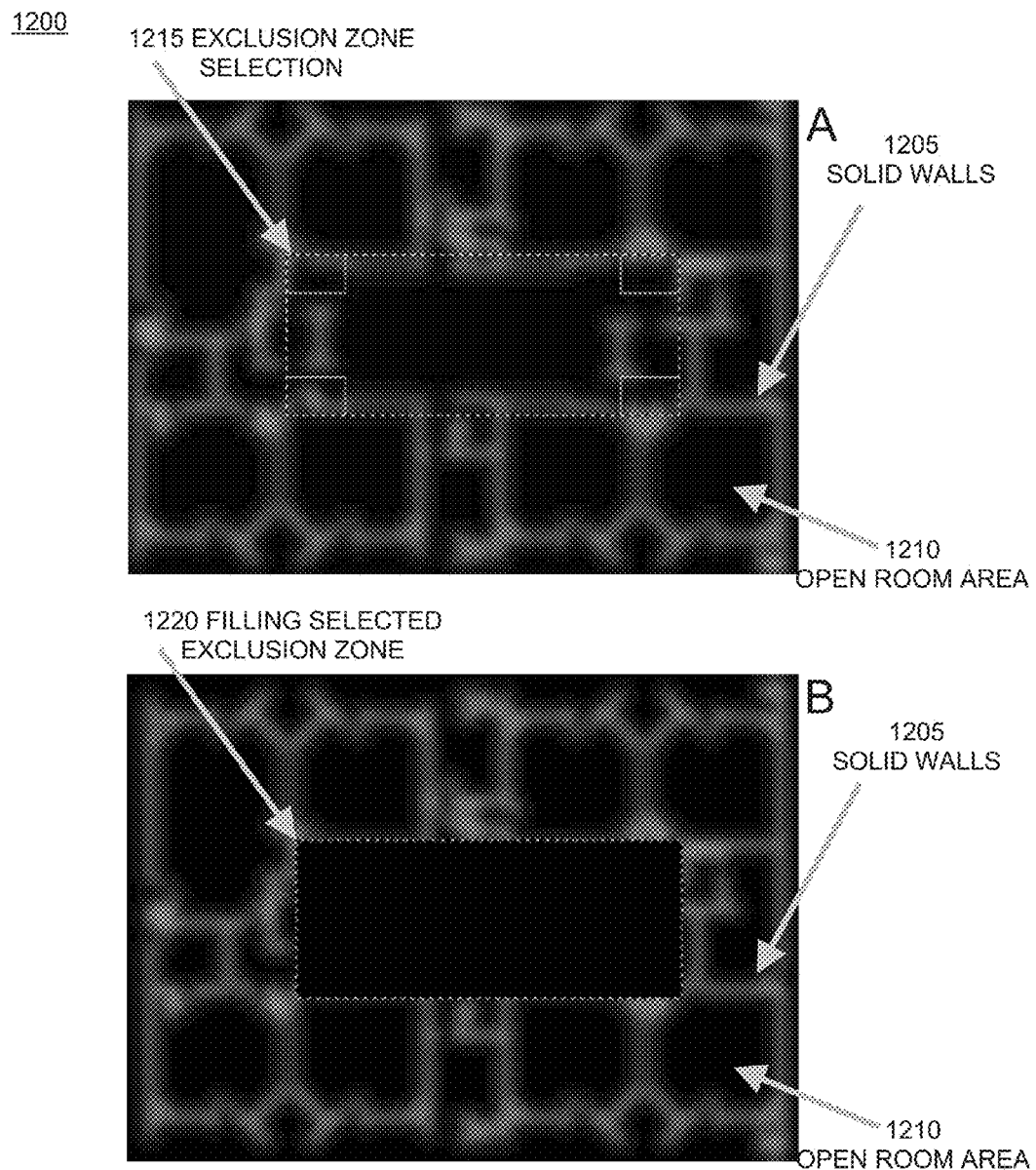
FIG. 12 is a depiction of selection and creation of an exclusion zone, and filling with color/intensity gradient configured in accordance with an embodiment of the invention.
Figure 13:
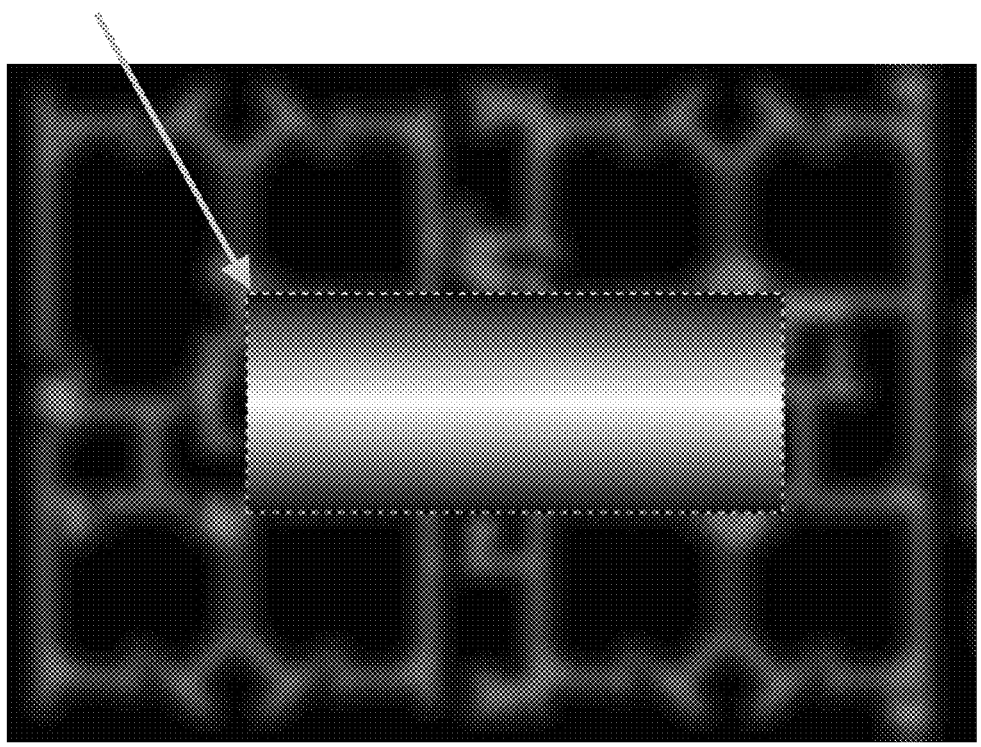
FIG. 13 is a depiction of the creation of a smooth exclusion zone configured in accordance with an embodiment of the invention.

FIGS. 12A and 12B provide a visual depiction 1200 of steps of the flowchart of FIG. 11. FIG. 12A (top) shows exclusion zone selection and creation, and FIG. 12 B (bottom) shows filling for color/intensity gradient. Solid walls are shown in white 1205. Open room areas are shown as black 1210. The exclusion zone area for selection is outlined 1215. Filling of selected exclusion zone (FIG. 11, 1125) is illustrated as 1220 in FIG. 12B.

FIG. 13 provides a visual depiction 1300 of smoothing steps of the flowchart of FIG. 11. The smoothed exclusion zone is shown with a black/white gradient 1305.

In embodiments, deployment of exclusion zones requires the implementation of a gradient descent algorithm and creation of additional maps directly based on the floor map of the space where the system is installed. Gradient descent is a multivariate optimization technique. It employs an iterative method that, given an initial point, follows the negative of the gradient to move the point toward a critical point, the desired local minimum. This is concerned with local optimization.

The creation of the data derived from the floor maps is performed, for example, by running a generateDerivative.m script. For embodiments, this script has configuration file named config with the following structure.

TABLE 1

(6) Configuration File Format for Generate Derivative

| Field Name, Field Value (example) | Explanation |
| --- | --- |
| mask Name, Floor Plan_half_floor1_exclusion_smooth_low_res.png | The name of the exclusion map used to perform gradient descent search - note that this map has inverted perpendicular axis when compared to the map used in trainOverlap and testOverlap routines. |
| writeFlag, 1 | If set to value greater than 0, the script will save derivative in x, derivative in y, map itself and map settings. |

TABLE 1-continued (6) Configuration File Format for Generate Derivative

| Field Name, Field Value (example) | Explanation |
| --- | --- |
| xp0, 27 | Reference point 0 x coordinate in pixels (second MATLAB ® coordinate). |
| yp0, 26 | Reference point 0 y coordinate in pixels (first MATLAB ® coordinate). |
| xprf, 787 | Reference point 1 x coordinate in pixels (second MATLAB ® coordinate). |
| yprf, 26 | Reference point 1 y coordinate in pixels (second MATLAB ® coordinate). |
| D, 85.0 | Distance between reference points. |
| test_x, 30 | Test point x coordinate in feet. |
| test_y, 46 | Test point y coordinate in feet. |

In embodiments, a script, such as generateDerivative.m, produces all necessary data to run the gradient descent algorithm that finds local minima in the exclusion zone map—these minima are the allowed locations of RF tags. The script also performs the test search for the point with coordinates given through parameters test_x and test_y.

Figure 14:
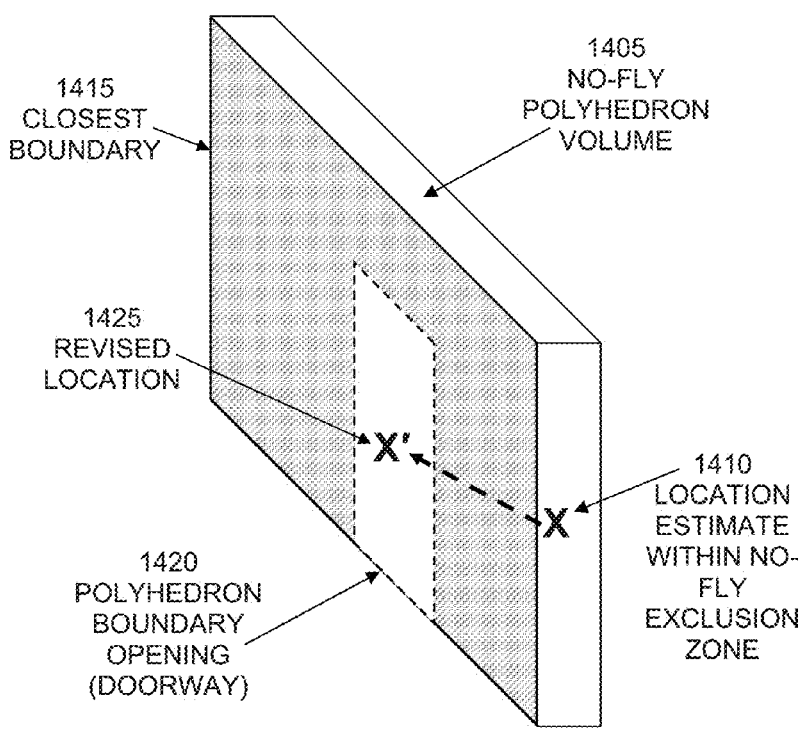
FIG. 14 is a depiction of a simplified no-fly exclusion zone revised location configured in accordance with an embodiment of the invention.

FIG. 14 is a depiction of a simplified no-fly exclusion zone revised location 1400. A no-fly exclusion zone is a region defined by a polyhedron (a solid in three dimensions with flat faces, straight edges, and vertices). Any location estimate that comes up inside a no-fly exclusion zone polyhedron is restricted to the closest boundary of the polyhedron, similar to hitting a wall. This then will eventually morph into placing an opening such as a doorway in the boundary, and only allow tags to move from one side to the other through the opening. For embodiments, the opening is defined by an additional intersecting polyhedron where one polyhedron is a "no-fly", while the other is defined as allowable space. In this way a "tunnel" is defined by one polyhedron such that it penetrates another (no-fly). A nonlimiting example would be a doorway through a wall, or an entire room with one or more doorways. In essence, the item associated with the tag will slide along the wall to the doorway before it can enter a room. This overcomes problems with slower update rates where the system normally would show more of an "as the crow flies" movement instead of, for example, down the hall around the corner and into the room ("as the crow flies" is an idiom for the shortest distance between two points irrespective of the intervening environment). This simplified example shows a no-fly exclusion zone polyhedron 1405 with an original location estimate 1410 within no-fly zone polyhedron 1405. Estimated location 1410 is closest to wall face/boundary 1415. In embodiments, polyhedron boundary opening 1420 is defined by creating a second polyhedron identified as allowed space, or it is created by the negative space defined by the original polyhedron. For embodiments, no-fly zone polyhedron boundary openings correspond to the location of openings designated in facility maps. Location estimate is adjusted with revised location 1425.

Figure 15:
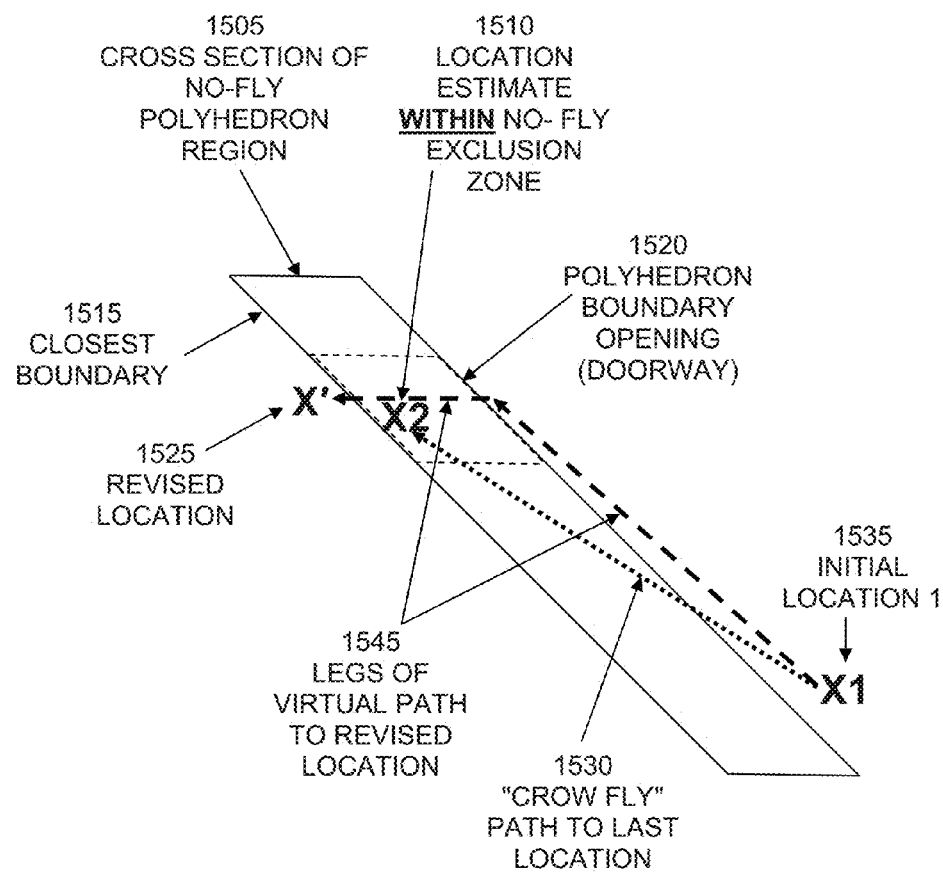
FIG. 15 is a depiction of a no-fly exclusion zone virtual path configured in accordance with an embodiment of the invention.

FIG. 15 is a depiction of a no-fly exclusion zone virtual path 1500. Similar to FIG. 14, a cross section 1505 of a no-fly exclusion zone polyhedron is shown. There is a location estimate 1510 (X2) within no-fly zone polyhedron 1505. Estimated location 1510 is closest to polyhedron wall face/boundary 1515. A polyhedron boundary opening 1520 is created by defining another, "tunnel", polyhedron. Location estimate X2, 1510, is adjusted with revised location 1525 (X'). A virtual path is created to replace a misleading "as the crow flies" straight line 1530. This misleading straight line 1530 is a line between PREVIOUS location estimate 1535 (X1) and location estimate 1510 (X2). X1 location estimate 1535 is calculated before location estimate 1510 within no-fly zone polyhedron 1505. Revised X' location estimate 1525 is calculated after location estimate 1510 within no-fly zone polyhedron 1505. Misleading "as the crow flies" path 1530 is replaced by virtual path 1545 having two legs. Since it is impossible for the item associated with locations X1 and X2 to have traveled through the no-fly exclusion zone 1505 by path 1530, virtual path 1545 through doorway 1520 replaces path 1530.

Figure 16:
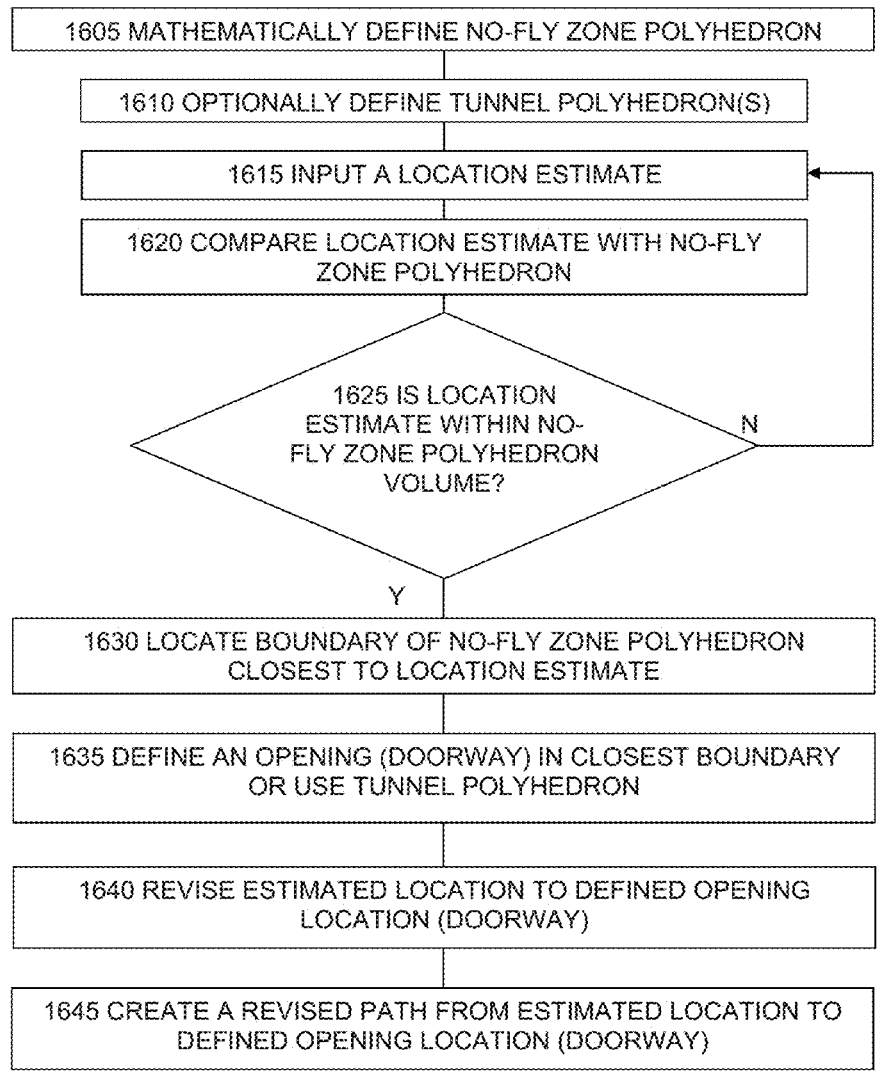
FIG. 16 is a flowchart of a no-fly exclusion zone method configured in accordance with an embodiment of the invention.

FIG. 16 is a flowchart depicting steps of a no-fly exclusion zone method 1600. Steps comprise: mathematically defining a no-fly exclusion zone polyhedron 1605; optionally defining a tunnel polyhedron depicting an allowable space region through which objects may pass 1610; inputting a location estimate 1615; comparing the location estimate with the no-fly exclusion zone polyhedron region 1620; determining if the location estimate is within the no-fly exclusion zone polyhedron 1625; if not, go to the step of inputting a location estimate 1615; if yes, locate the boundary of the no-fly exclusion zone polyhedron closest to the location estimate 1630; define an opening (doorway) in closest boundary (or use defined tunnel polyhedron) 1635; revise the estimated location to the defined opening location (doorway) 1640; create a revised path from the estimated location to the defined opening location (doorway) 1645. In embodiments, a line is drawn between the previous location estimate and the current location estimate. Where the line between the two intersects the polyhedron, the location estimate is revised to be at the point of intersection. In embodiments, to reduce computational time a predetermined list of points is defined such that the processing steps will revise the location estimate to be that of the closest point to the intersection. This is analogous to dropping a trail of breadcrumbs and choosing the breadcrumb closest to the intersection with the polyhedron.

The invention has industrial application in the use of electrical computing devices and real time object location determination. The apparatus and methods described allow object location determination by means of programming of the computing devices. The types of events associated with the object location determination apparatus and methodologies include physical and technical phenomena, and therefore have value in the field of economic endeavor.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

What is claimed is:

1. A real time location system (RTLS) for revised real time location determination of at least one object comprising:
   a location environment;
   at least one tag located within said location environment;
   a processor to calculate a location of said at least one tag located within said location environment;
   at least one exclusion zone in said location environment;
   a map representing said location environment, said map processed by Gaussian blurring of said at least one exclusion zone;
   an original location determination of said tag in said location environment;
   a revised location determination of said tag in said location environment,
   said revised location determination calculated by said processor by applying attributes of said at least one exclusion zone to said original location determination of said at least one tag if it is determined that said original location determination is cospatial with said at least one exclusion zone,
   said revised location determination of said at least one tag including gradient descent algorithms; and
   said revised location determination modifying operation of said RTLS by modifying original location determinations.

2. The system of claim 1, wherein said calculation by said neural network comprises setup and training of said neural network.

3. The system of claim 2, wherein said training comprises diverted output.

4. The system of claim 1, wherein said at least one exclusion zone comprises locations in which it would be improbable for tags to be found.

5. The system of claim 1, wherein said at least one exclusion zone comprises locations in which it would be impossible for tags to be found.

6. The system of claim 1, wherein said original location determination comprises noise.

7. The system of claim 1, wherein said original location determination comprises at least one missed reading of signals from said at least one tag.

8. The system of claim 1, wherein said revised real time location determination comprises an input map of said location environment.

9. The system of claim 1, wherein said revised real time location determination comprises receiving wireless RF transmissions from said at least one tag at at least one transceiver.

10. A method for revised real time location determination of at least one object by a real time location system (RTLS) comprising the steps of:
   designating a location environment;
   obtaining a map of said location environment;
   defining at least one exclusion zone in said location environment , said map processed by Gaussian blurring of said at least one exclusion zone ;
   providing at least one tag located within said location environment;
   obtaining an original location determination;

producing a revised location determination of said tag in said location environment, said revised location determination calculated by applying attributes of said at least one exclusion zone to said original location determination of said at least one tag, said revised location determination of said at least one tag including gradient descent algorithms; and said revised location determination modifying operation of said RTLS by correcting for impossible and improbable original location determinations.

11. The method of claim 10, wherein said step of producing a revised location comprises training a neural network; and said revised location determination is calculated by said neural network.

12. The method of claim 11, wherein the step of training comprises measured data from said at least one tag.

13. The method of claim 12, wherein said measured data comprises at least one physically measurable property associated with a position in three-dimensional space.

14. The method of claim 11, wherein the step of training comprises modeled data.

15. The method of claim 11, further comprising:
mathematically defining a no-fly exclusion zone polyhedron;
inputting a location estimate;
comparing said location estimate with a four dimensional space-time region of said no-fly exclusion zone polyhedron;
determining if said location estimate is within said no fly exclusion zone polyhedron region;
locating a boundary of said no-fly exclusion zone polyhedron closest to said location estimate;
defining allowed locations in said closest boundary;
revising said estimated location to said defined allowed locations;
and
creating a revised virtual path from said estimated location to said revised location.

16. A neural network real time location system (RTLS) for revised real time location determination of at least one object comprising:
a map representing a location environment;
at least one tag located within said location environment;
a neural network to process a location of said at least one tag located within said location environment, said neural network trained with wireless RF data from said at least one tag and corresponding locations of said at least one tag;
at least one exclusion zone in said location environment, said map processed by Gaussian blurring of said at least one exclusion zone;
an original location determination of said tag in said location environment;
a revised location determination of said tag in said location environment,
said revised location determination calculated by said neural network by applying attributes of said at least one exclusion zone to said original location determination of said at least one tag including gradient descent algorithms, and
said revised location determination modifying operation of said RTLS by correcting for impossible and improbable original location determinations.

* * * * *